Sept. 17, 1935.  B. E. WALLACE  2,014,824

BEVERAGE DISPENSING APPARATUS

Filed July 7, 1933

INVENTOR
Bert E. Wallace
BY
Wm. J. Bell
ATTORNEY

Patented Sept. 17, 1935

2,014,824

UNITED STATES PATENT OFFICE 2,014,824

BEVERAGE DISPENSING APPARATUS

Bert E. Wallace, Barrington, Ill.

Application July 7, 1933, Serial No. 679,274

9 Claims. (Cl. 225—18)

This invention relates to beverage dispensing apparatus adapted for dispensing beer and similar beverages.

The storage space of a refrigerator is limited, particularly in the types in use in homes, and for this reason only a limited amount of a bottled beverage may be cooled in a refrigerator at a given time because of the relatively large space required for the storing of bottles. One object of my invention is to furnish beverage in a container which will occupy but relatively small space in a refrigerator but which will nevertheless hold a sufficient quantity of the beverage to meet normal requirements. An ancillary object is to furnish beverage in a container which will not impair the air circulation in the refrigerator.

Moreover, many people prefer a tap dispensed beverage over a bottled beverage and this is particularly true of beer. Therefore, another object of my invention is to furnish beer in a container from which it may be dispensed through a tap.

In order to properly preserve beer and keep it in palatable condition, it is necessary that it be kept under pressure as this prevents the escape of carbonic gas therefrom. Likewise, it is necessary to have beer under pressure when it is to be dispensed through a tap. Still another object of my invention is to keep beer under pressure in a suitable container to prevent deterioration thereof and to permit dispensing through a tap. An ancillary object is to enable variation of the pressure to which the beer is subjected so that sufficient pressure to maintain the beer in palatable condition may be maintained while at the same time the pressure may be kept down to avoid a wild condition and excessive foam when the beer is dispensed.

Further objects of the invention are to provide a container having inset ends to thereby afford convenient grips so as to facilitate handling of the container; to provide a container which may be easily cleaned and maintained in a sanitary condition to prevent contamination of a beverage stored therein; to so equip the container that a pressure supply may be expeditiously associated therewith to maintain pressure on the beverage in the container; to provide an adjustable valve for maintaining proper pressure on the beer; to permit detachment of the valve when the container is empty and to automatically seal the container independently of the valve prior to installation and after removal of the valve; to provide a dispensing tap which will quickly open to full capacity and which may be quickly closed so that unrestricted flow of the beverage is afforded to thereby reduce the tendency to foam; and to provide a beer dispensing apparatus of simple and economical construction and efficient and positive in use.

In the selected embodiment of the invention illustrated in the accompanying drawing Fig. 1 is a fragmentary front elevation of a refrigerator with the door in open position and having my novel beverage container stored therein;

Fig. 4 is a view, similar to Fig. 3, showing the container with the pressure control valve removed therefrom;

Figure 1:
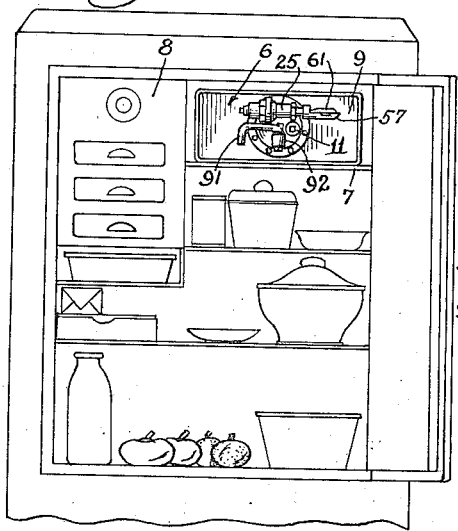
Figure 2:
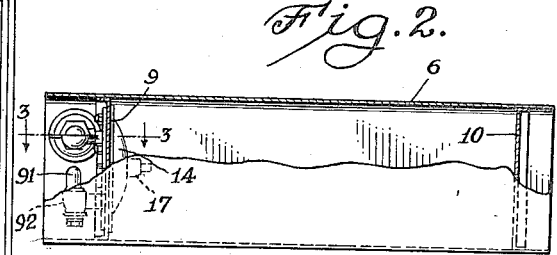
Fig. 2 is a side view of the container partly in elevation and partly in section.

In the preferred forms of the invention illustrated in the accompanying drawing, I show a container 6 which may be mounted on a shelf 7 of a refrigerator including the usual evaporator 8 mounted adjacent one side wall thereof. The container 6 is preferably of less width than the space between the evaporator 8 and the opposite side wall of the refrigerator so that there will be ample space about the container 6 to afford proper circulation of air in the refrigerator.

The container is in the form of a substantially rectangular sleeve and includes end walls 9 and 10 which are secured in the sleeve in spaced relation with the ends thereof. By spacing the end walls 9 and 10 from the ends of the sleeve convenient grips are provided which may be grasped to facilitate transportation of the container. An opening 12 in the end wall 9 is surrounded by an inset flange 13 unitary with the wall 9. A dome 14 is mounted in the opening 12 and is extended into the container and has the peripheral edge thereof aligned with the flange 13. A washer 15 is interposed between the flange and the rim of the dome and the rim is fast to the flange by suitable nuts and bolts 16. At the apex of the dome 14 is a boss 17 having a bore 18 therein into which the stem 19 of a valve 20 is extended. A shoulder 21 is provided in the bore 18 and a spring 22 is interposed between the shoulder 21 and the head 23 at the free end of the stem 19 to thereby urge the valve 20 into engagement with the valve seat 24. The parts associated with the boss 17 provide a check valve which is adapted to be unseated when the pressure control valve and gas supply are associated with the container 6.

The pressure valve includes a body 25 having a tapped opening 26 therein in which one end of a nipple 27 is secured. The nipple 27 includes a peripheral flange 28 and has a boss 29 extending beyond the flange 28. The boss 29 is adapted to be extended into the bore 18 so that the end thereof will engage the head 23. A nut 30 engages the flange 28 and a threaded portion on the periphery of the boss 17 and when the nut is tightened, the boss 29 is moved through the bore 18 and as the nut is further tightened, the valve 20 is unseated from the valve seat 24. A washer 31 is interposed between the end of the boss 17 and the flange 28 to prevent leakage thereby. A bore 32 extends through the nipple 27 and the boss 29 and terminates in angularly extending bores 33 at the outer end of the boss 29.

A chamber 34 in the body 25 is closed by a diaphragm 35 held in position by a hollow nut 36. A passage 37 extends between the inner end of the opening 26 and the chamber 34 and communication is established through this passage between the bore 32 and the chamber 34. A chamber 38 is provided in the body 25 at the end thereof opposite the chamber 34 and a bore 39 extends between these chambers. A nut 40 is secured in an enlarged portion in the bore 39 at the end thereof opening into the chamber 38 and provides a valve seat adapted to be engaged by the valve member 41 mounted on the stem 42 that extends through a bore in the nut 40 and the bore 39. The opposite end of this valve stem is connected to the diaphragm 35 by nuts 43 and 44. A spring 45 in the hollow nut 36 extends between the nut 44 and a spring stop 46. The spring 45 acts on the diaphragm 35 to disengage the valve member 41 from the valve seat on the nut 40. The chamber 34 is in communication with the container 6, as has been explained, and when the pressure in the container 6 and therefore the chamber 34 is sufficient to overcome the effect of the spring 45, the valve member 41 is seated whereupon passage through the bore 39 is closed off. The effectiveness of the spring 45 may be varied by adjusting the screw 47 which cooperates with the spring stop 46. A passage 48 interconnects the bore 39 and the chamber 34.

The chamber 38 is closed by a nut 49 including a nipple 50 having a bore 51 therein. A rubber washer 52 is mounted in the bore 51 and engages a plug 53 seated at the bottom of the bore 51. The plug 53 includes a finger 54 which projects through the bore in the washer 52. The finger has a pointed end for a purpose which will be described presently. A bore 55 is provided in the finger 54 and a passage 56 is provided in the nut 49. A turnbuckle 57 includes ears 58 and 59 and has a pocket 60 therein adapted to receive a gas containing cartridge 61. When the cartridge 61 is disposed in the pocket 60 and the turnbuckle is run inwardly, a frangible end on the cartridge is engaged with the pointed end of the finger 54 and at this time the portion of the cartridge adjacent the frangible end will be tightly engaged with the washer 52 so that a gas tight seal is provided. Hence, after the frangible end of the cartridge has been punctured by the pointed end of the finger 54, the turnbuckle may be backed up slightly whereupon gas will flow through the bore 55, passage 56, into chamber 38 and when the valve member 41 is disengaged from the valve seat on the member 40 gas will flow through the bore 49, passage 48, into chamber 34 from whence it will pass into the container 6. Gas so supplied to the container 6 will build up the pressure therein and when a predetermined pressure is built up in the container, as determined by the tension of the spring 45, this pressure will act on the diaphragm 35 to engage the valve member 41 with the seat on the nut 40 whereupon gas flow through the bore 39 is shut off.

Figure 5:
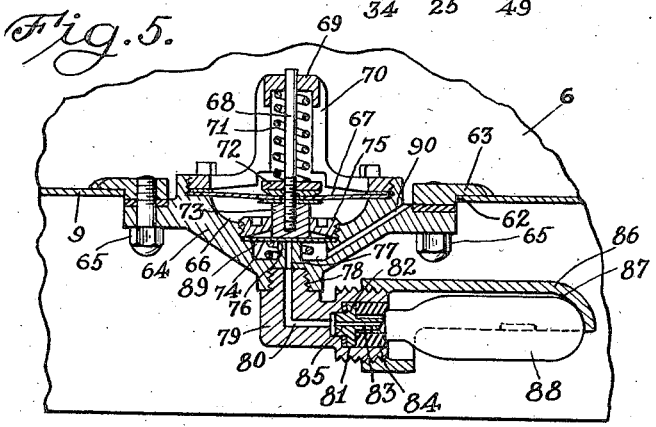
Fig. 5 is a view, similar to Fig. 3, showing a modified form of the invention.

In the form of the invention shown in Fig. 5, no check valve is provided and herein the pressure valve is directly connected to the wall 9 of the container 6. An opening 62 is provided in the wall 9 and in this instance is surrounded by a flanged ring 63 to which the peripheral edge of a dome 64 is secured by bolts 65 and the dome extends outwardly from the wall 9. A chamber 66 is provided by the dome 9 which is closed by a diaphragm 67 to which a valve stem 68 is secured. The valve stem extends through an opening in the strap 69 at the outer end of the boss 70 and a spring 71 extends between this strap and the nut 72 engaging the diaphragm. A nut 73 in the chamber 66 is connected to the valve stem 68 and is connected to a diaphragm 74 which is held in position by a nut 75. The diaphragm 74 cooperates with a valve seat 76 at the apex of the dome 64 and a passage 77 leads from this valve seat to an opening 78.

A right angle nipple 79 is fast in the opening 78 and has a bore 80 therein leading from the outer end of the bore 77. At the free end of the nipple 79 is a recess 81 at the bottom of which a plug 82 is seated. The plug 82 includes a finger 83 having a pointed end. A yieldable washer 84 surrounds the finger 83. A passage 85 leads from the free end of the finger 83 to the passage 80. A turnbuckle 86 is secured to the free end of the nipple 79 and has a pocket 87 therein adapted to receive a gas filled cartridge 88. When a cartridge is mounted in the pocket 87 and the turnbuckle is run inwardly, the pointed finger 83 punctures the frangible end of the cartridge 88, which cartridge at this end is tightly seated against the washer 84, and thereupon gas flows from the cartridge 88 through the passage 85, passage 80, and passage 77 and if at this time the diaphragm 74 is unseated from the valve seat 76, the gas will flow into the chamber 89 from whence the gas flows through the passage 90 into the container 6. As soon as there is a predetermined degree of pressure in the container 6, the diaphragm 67 is flexed whereupon the diaphragm 74 engages the valve seat 76 and closes off the flow of gas from the cartridge 88. However, as soon as the pressure in the container 6 falls to a predetermined minimum, the diaphragm 74 disengages the seat 76 whereupon additional gas is supplied to the container 6.

As best illustrated in Figs. 1 and 4, a boss is provided on the dome 14 which has an opening therein closed by a removable plug 11. At a suitable place on the wall 9 in the form of the invention shown in Fig. 5, a similar boss is provided which is also closed by a removable plug and the openings closed by the removable plugs afford filling openings through which beer or a similar beverage may be introduced into the chamber 6.

Figure 6:
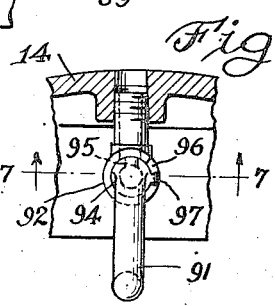
Fig. 6 is a fragmentary detail plan view of the outlet tap.

A valve or tap 92 is mounted in the dome 14 and a similar valve or tap is mounted at a suitable point in the wall 9 in the form of the invention shown in Fig. 5. The tap 92 includes a body 94 and a valve member 95. Vertically extending substantially rectangular openings are provided in the body 94 and in the valve member 95, and these openings are of restricted width transversely of the tap. The opening in the body of the tap communicates with the interior of the container and the opening in the valve member communicates with the spout 91. A suitable arrangement, such as the nut 93 and the spring 95', is provided for holding the valve member in the body. A shoulder 96 is formed on the body engageable by the stop 97 on the valve member. Normally the spout 91 is arranged to extend substantially parallel with the wall 9 and when it is in this position, the tap is closed. When the spout is rotated into a position to extend substantially at right angles to the wall 9, as illustrated in Fig. 6, the openings in the valve member and the body are aligned. Since these openings are of restricted area transversely of the tap they do not register until the spout is in the substantially right angular position, and this arrangement greatly facilitates the withdrawal of the beverage from the container, this being especially true in view of the fact that the openings afford substantially unrestricted passage almost instantaneously, and, furthermore, openings arranged as described permit the tap to be closed quickly.

The filled container is mounted on the shelf 7 of a refrigerator. The diaphragm of the pressure operated valve is so adjusted that it will admit gas into the container in a quantity sufficient to maintain a pressure in the container corresponding to the temperature to which the container is subjected. It is desirable that the pressure be kept as low as possible so that a wild condition and excessive foam will be avoided when the beer or other beverage is withdrawn from the container. However, it is known that it is necessary to subject beer to pressures which are directly proportionate to the temperature at which the beer is maintained so that the beer will be preserved in a palatable condition when stored for an appreciable period of time. Therefore, the pressure operated valve is so adjusted that it will maintain a pressure only sufficient to preserve the beer in palatable condition for such pressure will be sufficient to afford dispensing of the beer from the container through the discharge spout 92.

Figure 3:
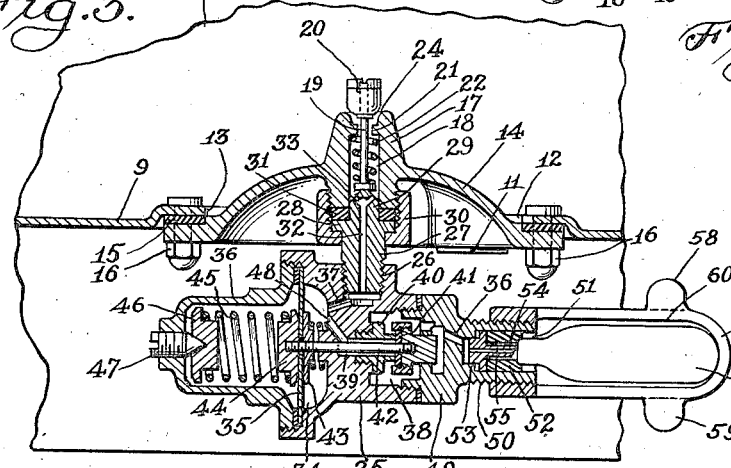
Fig. 3 is a horizontal sectional view taken substantially on the line 3—3 on Fig. 2.
Figure 7:
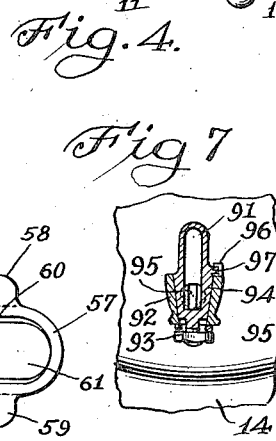
Fig. 7 is a transverse sectional view taken substantially on the line 7—7 on Fig. 6.

In either form of the invention the container is filled by the vendor of the beverage and is delivered to the consumer. In the form of the invention illustrated in Fig. 5, all that the consumer need do is to place the beverage in a refrigerator after a cartridge has been installed in the turnbuckle, in the manner previously described. However, in the form of the invention illustrated, for example, in Fig. 3, it will be necessary to attach the pressure operated valve and the gas supply to the container and in so doing, the check valve is unseated. The frangible end of the cartridge may be punctured at any desired time and since the end of the cartridge is tightly engaged with a resilient washer, gas escape is prevented. The pressure operated valve will function to maintain the desired pressure in the container. Preferably the valve controlled by the discharge spout will include an inlet nipple that will extend into the container to a point near the bottom thereof and adjacent the front end and therefore since the beverage will always be under pressure substantially all of the beverage may be withdrawn from the container without tilting it. The gas is introduced into the container near the top thereof and the beverage is withdrawn from the container near the bottom thereof, and this further insures substantially total dispensing of the beverage in the container. After all of the beverage has been withdrawn from the container, the consumer may return it to the vendor who will then sterilize and refill the container. The containers are preferably made of strong non-corrosible material such as, for example, stainless steel and particularly in the form of the invention illustrated, for example, in Fig. 3, it is possible to completely sterilize the container which will therefore avoid contamination and resulting spoilage of a beverage stored in the container.

I have illustrated and described two forms of my invention but it is to be understood that the invention is capable of further variation and modification and I therefore do not wish to be limited to the precise details set forth but desire to avail myself of such changes and alterations as fall within the purview of the following claims:

I claim:

1. A container of the class described including a body made of a non-corrosible material and substantially in the form of a rectangular sleeve, end walls mounted in said sleeve in spaced relation with the ends thereof, and means mounted on one of said end walls and positioned between the adjacent end of the sleeve and said wall so as not to project beyond the end of said sleeve and including a pressure operated valve, a source of pressure, and means connecting said source of pressure with said container and including a part through which flow is controlled by said valve.

2. A container of the class described comprising a sleeve, end walls mounted in said sleeve in spaced relation with the ends thereof, and means mounted on one of said end walls and positioned between the adjacent end of the sleeve and said wall so as not to project beyond the end of said sleeve and including a body having a chamber therein, a diaphragm mounted in said chamber, said body having a passage therein interconnecting said container and said chamber whereby pressure in said container may be impressed on said diaphragm, an attaching boss on said body and having a pocket therein, a resilient washer in said pocket, a rupturing member mounted in said pocket and extending through said resilient washer, supporting means connected to said attaching boss and having a gas supply member removably mounted therein, said gas supply member including a frangible part adapted to be broken by said rupturing member upon operation of said supporting means to engage said gas supply member with said resilient washer, said rupturing member and said body having a passage therein through which gas may flow from said gas supply member to said container, and a valve connected to said diaphragm and controlling flow through the last named passage whereby gas flow to said container is regulated by the gas pressure on said diaphragm.

3. A container of the class described comprising a sleeve, end walls mounted in said sleeve in spaced relation with the ends thereof, and means mounted on one of said end walls and positioned between the adjacent end of the sleeve and said wall so as not to project beyond the end of said sleeve and including a body having a chamber therein, a diaphragm mounted in said chamber, said body having a passage therein interconnecting said container and said chamber whereby pressure in said container may be impressed on said diaphragm, an attaching boss on said body and having a pocket therein, a resilient washer in said pocket, a rupturing member mounted in said pocket and extending through said resilient washer, supporting means connected to said attaching boss and having a gas supply member removably mounted therein, said gas supply member including a frangible part adapted to be broken by said rupturing member upon operation of said supporting means to engage said gas supply member with said resilient washer, said rupturing member and said body having a passage therein through which gas may flow from said gas supply member to said container, and a valve connected to said diaphragm and controlling flow through the last named passage whereby gas flow to said container is regulated by the gas pressure on said diaphragm, said chamber, attaching boss, and supporting means being mounted in alignment with each other whereby said parts may be disposed parallel with said end wall so as not to project beyond the end of said sleeve.

4. A container of the class described comprising a sleeve, end walls mounted in said sleeve in spaced relation with the ends thereof, a boss on one of said end walls and having a passage therein and a check valve at the inner end thereof adapted to control flow through said passage into said container and including a stem extending through said passage, a body having a boss extending therefrom and having a part adapted to be projected into said passage to engage said stem, means for securing the boss on said body to the boss on said end wall and urging said part inwardly to move said stem inwardly to disengage said check valve, said part being positioned between the adjacent end of the sleeve and said end wall so as not to project beyond the end of said sleeve and having a chamber therein, a diaphragm mounted in said chamber, said body having a passage therein interconnecting said container and said chamber whereby pressure in said container may be impressed on said diaphragm, an attaching boss on said body and having a pocket therein, a resilient washer in said pocket, a rupturing member mounted in said pocket and extending through said resilient washer, supporting means connected to said attaching boss and having a gas supply member removably mounted therein, said gas supply member including a frangible part adapted to be broken by said rupturing member upon operation of said supporting means to engage said gas supply member with said resilient washer, said rupturing member and said body having a passage therein through which gas may flow from said gas supply member to said container, and a valve connected to said diaphragm and controlling flow through the last named passage whereby gas flow to said container is regulated by the gas pressure on said diaphragm, said chamber, attaching boss, and supporting means being mounted in alignment with each other whereby said parts may be disposed parallel with said end wall so as not to project beyond the end of said sleeve.

5. A container of the class described comprising a sleeve, end walls mounted in the sleeve in spaced relation with the ends thereof, removable means mounted on one of said end walls, said removable means having devices mounted thereon and positioned between the adjacent end of the sleeve and said end wall so as not to project beyond the end of said sleeve, said devices including a pressure operated valve, a source of pressure, and means connecting said source of pressure with said container and including a part through which flow is controlled by said valve, and dispensing means mounted in said removable means and including a valve body positioned inwardly of the end of the container and having an outlet tap rotatably mounted therein, said body and said tap having elongated openings of restricted width therein and adapted to quickly move into registration upon rotation of said outlet tap to permit unrestricted flow of beverage from said container through said outlet tap, said outlet tap being moved beyond the end of said container to effect flow of beverage from the container and being positioned inwardly of the end of the container when flow from the container therethrough is closed off.

6. As a means for dispensing beverages, the combination of a container having rectangular metal heads and metal top, bottom and side walls secured to said heads, said container having flanges forming outer end recesses adjacent said heads, and beverage drawing means wholly contained in one of said recess and mounted on the adjacent one of said heads.

7. As a means for dispensing beverages, the combination of a container having rectangular metal heads and metal top, bottom and side walls secured to said heads, said container having flanges forming outer end recesses adjacent said heads, beverage drawing means wholly contained in one of said recesses and mounted on the adjacent one of said heads, and gas pressure producing means carried by said container within its outer surfaces and communicating with the interior of said container.

8. As a means for dispensing beverages, the combination of a container having rectangular metal heads and metal top, bottom and side walls secured to said heads, said container having flanges forming outer end recesses adjacent said heads, and beverage drawing means wholly contained in one of said recesses and mounted on the adjacent one of said heads, said beverage drawing means comprising a plug valve and a delivery pipe extending laterally from said valve and movable therewith, said delivery pipe being in the adjacent one of said end recesses for the closed position of said valve and extending from said recess for the open position of said valve.

9. As a means for dispensing beverages, the combination of a container having rectangular metal heads and metal top, bottom and side walls secured to said heads, said container having flanges forming outer end recesses adjacent said heads, beverage drawing means wholly contained in one of said recesses and mounted on the adjacent one of said heads, and gas pressure producing means carried by said container within its outer surfaces and communicating with the interior of said container, said gas pressure producing means comprising a metal cylinder containing compressed gas, and a pressure limiting valve connected with said cylinder and communicating with the interior of said container.

BERT E. WALLACE.